United States Patent
Nanbu

(10) Patent No.: US 8,248,360 B2
(45) Date of Patent: Aug. 21, 2012

(54) BACKLIGHT CONTROL DEVICE AND DISPLAY APPARATUS INCLUDING THE SAME

(75) Inventor: Kohei Nanbu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 309 days.

(21) Appl. No.: 12/452,080

(22) PCT Filed: Jun. 10, 2008

(86) PCT No.: PCT/JP2008/060586
§ 371 (c)(1),
(2), (4) Date: Dec. 15, 2009

(87) PCT Pub. No.: WO2009/001668
PCT Pub. Date: Dec. 31, 2008

(65) Prior Publication Data
US 2010/0127963 A1 May 27, 2010

(30) Foreign Application Priority Data
Jun. 26, 2007 (JP) .................................. 2007-168097

(51) Int. Cl.
G09G 3/36 (2006.01)
(52) U.S. Cl. ...................................................... 345/102
(58) Field of Classification Search ............ 345/87–104, 345/204, 690, 208–213
See application file for complete search history.

(56) References Cited

U.S. PATENT DOCUMENTS

| | | | | |
|---|---|---|---|---|
| 7,598,940 B2 * | 10/2009 | Chou et al. | ..................... | 345/102 |
| 7,928,956 B2 * | 4/2011 | Chao et al. | ..................... | 345/102 |
| 2002/0047556 A1 | 4/2002 | Tajika et al. | | |
| 2006/0055660 A1 * | 3/2006 | Teranishi | ..................... | 345/102 |
| 2007/0024570 A1 | 2/2007 | Kumamoto | | |
| 2007/0024574 A1 * | 2/2007 | Wu | ..................... | 345/102 |
| 2008/0074381 A1 * | 3/2008 | Kumamoto | ..................... | 345/102 |

FOREIGN PATENT DOCUMENTS

| | | |
|---|---|---|
| JP | 58-131700 | 8/1983 |
| JP | 59-130095 | 7/1984 |
| JP | 61-198594 | 9/1986 |
| JP | 2002-107692 | 4/2002 |
| WO | WO 2005/027590 | 3/2005 |

OTHER PUBLICATIONS

ISR and English Translation of ISR.

* cited by examiner

Primary Examiner — Stephen Sherman
(74) Attorney, Agent, or Firm — Harness, Dickey & Pierce, P.L.C.

(57) ABSTRACT

One embodiment of the present invention discloses a backlight control device that provides PWM control inverters with PWM signals generated in accordance with a dimming level input through a light receiving section that receives infrared light, the inverters causing fluorescent lamps that emit visible light and infrared light to illuminate. The backlight control device includes a phase adjusting section that changes a phase difference between a first PWM signal for driving a first lamp group and a second PWM signal for driving a second lamp group according to the dimming level when the dimming level is at least in a predetermined range of all dimming levels, the first and second lamp groups each including at least one lamp. This provides a backlight control device that enables reduction of faulty operation in an infrared-based apparatus.

3 Claims, 11 Drawing Sheets

FIG. 10

| DIMMING LEVEL | DUTY RATIO | Δt₂ PHASE EQUIVALENT [°] | Δt₂ [μs] | PHASE DIFFERENCE [°] | TIME SHIFT LENGTH [μs] | RESPONSIVENESS TO REMOTE CONTROLLER |
|---|---|---|---|---|---|---|
| -16 | 40.0% | 130.0 | 808 | 180.0 | 1,111 | △ |
| -15 | 42.0% | 137.0 | 848 | 180.0 | 1,111 | △ |
| -14 | 44.0% | 145.0 | 896 | 180.0 | 1,111 | ○ |
| -13 | 46.0% | 151.0 | 936 | 180.0 | 1,111 | ○ |
| -12 | 48.0% | 159.0 | 984 | 180.0 | 1,111 | ○ |
| -11 | 50.0% | 166.0 | 1,030 | 180.0 | 1,111 | ○ |
| -10 | 52.0% | 173.0 | 1,070 | 180.0 | 1,111 | ○ |
| -9 | 54.0% | 179.0 | 1,110 | 180.0 | 1,111 | ○ |
| -8 | 55.0% | 183.0 | 1,140 | 180.0 | 1,111 | ○ |
| -7 | 57.0% | 190.0 | 1,180 | 180.0 | 1,111 | ○ |
| -6 | 59.0% | 18.1 | 112 | 180.0 | 1,111 | ○ |
| -5 | 61.0% | 24.5 | 152 | 180.0 | 1,111 | ○ |
| -4 | 63.0% | 32.3 | 200 | 180.0 | 1,111 | ○ |
| -3 | 65.0% | 40.0 | 248 | 180.0 | 1,111 | ○ |
| -2 | 67.0% | 47.7 | 296 | 180.0 | 1,111 | × |
| -1 | 69.0% | 55.5 | 344 | 180.0 | 1,111 | × |
| STANDARD | 70.0% | 59.4 | 368 | 180.0 | 1,111 | × |
| +1 | 72.0% | 67.1 | 416 | 180.0 | 1,111 | × |
| +2 | 74.0% | 73.5 | 456 | 180.0 | 1,111 | × |
| +3 | 76.0% | 81.3 | 504 | 180.0 | 1,111 | × |
| +4 | 78.0% | 86.5 | 536 | 180.0 | 1,111 | × |
| +5 | 80.0% | 89.0 | 552 | 180.0 | 1,111 | × |
| +6 | 82.0% | 96.8 | 600 | 180.0 | 1,111 | × |
| +7 | 84.0% | 112.0 | 696 | 180.0 | 1,111 | × |
| +8 | 85.0% | 114.0 | 704 | 180.0 | 1,111 | × |
| +9 | 87.0% | 125.0 | 776 | 180.0 | 1,111 | ○ |
| +10 | 89.0% | 139.0 | 864 | 180.0 | 1,111 | ○ |
| +11 | 91.0% | 150.0 | 928 | 180.0 | 1,111 | ○ |
| +12 | 93.0% | 163.0 | 1,010 | 180.0 | 1,111 | ○ |
| +13 | 95.0% | 173.0 | 1,070 | 180.0 | 1,111 | ○ |
| +14 | 97.0% | 182.0 | 1,130 | 180.0 | 1,111 | ○ |
| +15 | 99.0% | 186.0 | 1,150 | 180.0 | 1,111 | ○ |
| +16 | 100.0% | − | − | 180.0 | 1,111 | ○ |

FIG. 11

| DIMMING LEVEL | DUTY RATIO | Δt₂ PHASE EQUIVALENT [°] | Δt₂ [μs] | PHASE DIFFERENCE [°] | TIME SHIFT LENGTH [μs] | RESPONSIVENESS TO REMOTE CONTROLLER |
|---|---|---|---|---|---|---|
| −16 | 40.0% | 130.0 | 808 | 180.0 | 1,111 | △ |
| −15 | 42.0% | 137.0 | 848 | 180.0 | 1,111 | △ |
| −14 | 44.0% | 145.0 | 896 | 180.0 | 1,111 | ○ |
| −13 | 46.0% | 151.0 | 936 | 180.0 | 1,111 | ○ |
| −12 | 48.0% | 159.0 | 984 | 180.0 | 1,111 | ○ |
| −11 | 50.0% | 166.0 | 1,030 | 180.0 | 1,111 | ○ |
| −10 | 52.0% | 173.0 | 1,070 | 180.0 | 1,111 | ○ |
| −9 | 54.0% | 179.0 | 1,110 | 180.0 | 1,111 | ○ |
| −8 | 55.0% | 183.0 | 1,140 | 180.0 | 1,111 | ○ |
| −7 | 57.0% | 190.0 | 1,180 | 180.0 | 1,111 | ○ |
| −6 | 59.0% | 18.1 | 112 | 180.0 | 1,111 | ○ |
| −5 | 61.0% | 24.5 | 152 | 180.0 | 1,111 | ○ |
| −4 | 63.0% | 32.3 | 200 | 180.0 | 1,111 | ○ |
| −3 | 65.0% | 40.0 | 248 | 180.0 | 1,111 | ○ |
| −2 | 67.0% | 47.7 | 296 | 187.7 or 102.7 | 1,159 or 634 | ○ |
| −1 | 69.0% | 55.5 | 344 | 195.5 or 110.5 | 1,207 or 682 | ○ |
| STANDARD | 70.0% | 59.4 | 368 | 199.4 or 114.4 | 1,231 or 706 | ○ |
| +1 | 72.0% | 67.1 | 416 | 207.1 or 122.1 | 1,278 or 754 | ○ |
| +2 | 74.0% | 73.5 | 456 | 213.5 or 128.5 | 1,318 or 793 | ○ |
| +3 | 76.0% | 81.3 | 504 | 221.3 or 136.3 | 1,366 or 841 | ○ |
| +4 | 78.0% | 86.5 | 536 | 226.5 or 141.5 | 1,398 or 873 | ○ |
| +5 | 80.0% | 89.0 | 552 | 229.0 or 144.0 | 1,414 or 889 | ○ |
| +6 | 82.0% | 96.8 | 600 | 236.8 or 151.8 | 1,462 or 937 | ○ |
| +7 | 84.0% | 112.0 | 696 | 252.0 or 167.0 | 1,556 or 1,031 | ○ |
| +8 | 85.0% | 114.0 | 704 | 254.0 or 169.0 | 1,568 or 1,043 | ○ |
| +9 | 87.0% | 125.0 | 776 | 180.0 | 1,111 | ○ |
| +10 | 89.0% | 139.0 | 864 | 180.0 | 1,111 | ○ |
| +11 | 91.0% | 150.0 | 928 | 180.0 | 1,111 | ○ |
| +12 | 93.0% | 163.0 | 1,010 | 180.0 | 1,111 | ○ |
| +13 | 95.0% | 173.0 | 1,070 | 180.0 | 1,111 | ○ |
| +14 | 97.0% | 182.0 | 1,130 | 180.0 | 1,111 | ○ |
| +15 | 99.0% | 186.0 | 1,150 | 180.0 | 1,111 | ○ |
| +16 | 100.0% | − | − | 180.0 | 1,111 | ○ |

BACKLIGHT CONTROL DEVICE AND DISPLAY APPARATUS INCLUDING THE SAME

TECHNICAL FIELD

The present invention relates to a backlight control device that employs PWM (Pulse Width Modulation) light control method for use in a liquid crystal display or the like.

BACKGROUND ART

In recent years, a display apparatus with a flat display as a display device is in widespread use for its ease of reduction in size and thickness. In many cases, such a flat display is used in a liquid crystal display apparatus that facilitates multicolor display. A transmissive liquid crystal display apparatus is generally provided with a backlight device to secure luminance on a display screen. Besides, a liquid crystal display apparatus using both reflective method and transmissive method, so-called transflective liquid crystal display apparatus is also provided with a backlight device as a light source for transmissive mode.

As the light source for backlight device, a fluorescent lamp, such as a cold-cathode tube, is commonly used. Examples of a major backlighting method include a direct lighting method where light emitted from a lamp enters a liquid crystal panel directly from the back of the liquid crystal panel, and a side lighting method where light emitted from a lamp, disposed on the side of a liquid crystal panel, is spread over the entire area of the liquid crystal panel through an optical waveguide.

For such a backlight device, an inverter controls illumination for luminance conditioning (dimming) of fluorescent lamps and other purposes. Particularly, a PWM inverter adjusts an electrical discharge time of a fluorescent lamp by controlling a pulse width of a pulse voltage applied at given intervals, which facilitates dimming, and the PWM inverter is therefore used for dimming control of fluorescent light for general lighting. The lighting control of a backlight lamp by PWM inverter is described in Patent Literature 1 and other documents.

CITATION LIST

Patent Literature 1
Japanese Patent Application Publication, Tokukai, No. 2002-107692 A (Publication Date: Apr. 10, 2002)

SUMMARY OF INVENTION

Technical Problem

A fluorescent lamp emits visible light and infrared light, which causes the following problem. That is, when a remote manipulator (remote controller) which comprises (i) a transmitter that transmits infrared signals of high frequencies and (ii) a receiver that receives such infrared signals is manipulated nearby a display apparatus, faulty operation occurs in the receiver (light receiving section) of the remote manipulator. The transmitter of the remote manipulator is, for example, a remote controller by which the display apparatus is operated, and the light receiving section is, for example, an infrared reception sensor provided in a body of the display apparatus.

Now, the principle of the faulty operation in the light receiving section is explained. FIG. 12 is a graph showing the sensitivity of a common infrared reception sensor (light receiving section), and specifically showing a relationship between a wavelength of infrared light and sensitivity of the light receiving section. As shown in FIG. 12, the light receiving section receives infrared light whose wavelength is in a particular range.

FIG. 13 is a graph showing an example of a profile of intensity (IR intensity) of infrared light with a wavelength of 912 nm emitted from a display apparatus, i.e. infrared light emitted from fluorescent lamps via a display panel, versus time. FIG. 14 is a graph showing an example of a profile of intensity (IR intensity) of infrared light with a wavelength of 965 nm emitted from a display apparatus versus time. Note that FIGS. 13 and 14 also show the properties changing with temperature changes. As shown in FIGS. 13 and 14, it is clear that the IR intensity is great especially when a wavelength of infrared light emitted from the display apparatus is 912 nm. Further, the intensity of infrared light decreases with time. For this reason, the intensity is the greatest immediately after the display apparatus is turned on and under the like circumstances.

As described above, the range of a wavelength of infrared light that the light receiving section can receive overlaps that of a wavelength of infrared light emitted from the display apparatus. This causes infrared light emitted from the display apparatus to be received by the light receiving section, which results in the occurrence of the above-described faulty operation. Such faulty operation in the light receiving section causes the user of the display apparatus to feel that the display apparatus is less responsive to the remote controller, and also causes the failure in execution of a user-specified manipulation.

The present invention has been attained in view of the above problem, and an object of the present invention is to provide a backlight control device which can reduce the occurrence of the faulty operation in an infrared-based apparatus, and a display apparatus including the backlight control device.

In order to solve the above problem, a backlight control device according to the present invention is a backlight control device which provides PWM control inverters with PWM signals generated in accordance with a dimming level input through a light receiving section that receives infrared light, the inverters causing lamps that emit visible light and infrared light to illuminate, the backlight control device including: a phase adjusting section that changes a phase difference between a first PWM signal for driving a first lamp group and a second PWM signal for driving a second lamp group according to the dimming level when the dimming level is at least in a predetermined range of all dimming levels, the first and second lamp groups each including at least one lamp.

As described previously, it is known that the faulty operation in the light receiving section is caused by its reception of infrared light emitted from lamps, which light is different from target infrared light transmitted from an operating section. Further, an experiment described later proved that the faulty operation in the light receiving section occurs when a dimming level of the lamps is in a particular range, and occurs due to difference in phase difference between separate PWM signals by which separate lamp groups are respectively driven.

According to the arrangement of the present invention, a phase difference between the first PWM signal for driving the first lamp group and the second PWM signal for driving the second lamp group is changed according to a dimming level. This makes it possible to change the phase difference according to a dimming level so that the infrared light emitted from the lamps is not received by the light receiving section. This eliminates the possibility that the light receiving section receives infrared light emitted from the lamps, which reduces the occurrence of the faulty operation in the light receiving section. This enables the light receiving section to accurately receive the user-specified operation and then execute the corresponding processing.

Note that the predetermined range refers to a range in which the faulty operation occurs in the light receiving section due to the effect of infrared light emitted from the lamps.

The backlight control device is preferably arranged such that the phase adjusting section sets the phase difference between the first and second PWM signals to be 180° at a dimming level outside the predetermined range.

According to the above arrangement, the phase difference between the first and second PWM signals is set to be 180° at a dimming level outside the predetermined range, which enables shortening of the entire lamp flashing period. This makes it possible to reduce the occurrence of the faulty operation in the light receiving section and to suppress interference between a display panel and a backlight.

The above backlight control device is preferably arranged such that the dimming level and the phase difference are previously associated with each other in a table, and the phase adjusting section shifts respective phases of the first and second PWM signals in accordance with the phase difference obtained with reference to the table.

It is preferable that the backlight control device further includes: a memory section having a table stored therein, the table having (i) the dimming level input through the light receiving section, (ii) a duty ratio corresponding to the dimming level, and (iii) the phase difference between the first and second PWM signals corresponding to the dimming level, wherein (i), (ii), and (iii) are associated with each other; a duty ratio obtaining section referencing the table and obtaining the duty ratio corresponding to the input dimming level; a phase difference obtaining section referencing the table and obtaining the phase difference corresponding to the input dimming level; and a PWM signal generating section generating the first and second PWM signals in accordance with the duty ratio obtained by the duty ratio obtaining section, wherein the phase difference adjusting section sets the phase difference between the first and second PWM signals, both of which are generated by the PWM signal generating section, to be the phase difference obtained by the phase difference obtaining section.

According to the above arrangement, the phase difference corresponding to the dimming level can be obtained with reference to the preset table. Therefore, it is possible to reduce the occurrence of the above-described faulty operation with a simple structure.

A display apparatus of the present invention includes: a display panel; and a backlight device irradiating the display panel with light, wherein the backlight device includes any one of the backlight control devices.

A display apparatus of the present invention includes any one of the backlight control devices in the backlight device irradiating light with the display panel, which enables reducing the occurrence of the faulty operation in the light receiving section.

Additional objects, features, and strengths of the present invention will be made clear by the description below. Further, the advantages of the present invention will be evident from the following explanation in reference to the drawings.

BRIEF DESCRIPTION OF DRAWINGS

FIG. 10 is a view showing the relationship between a dimming level and whether or not faulty operation occurs in the conventional liquid crystal display apparatus.

FIG. 11 is a view showing the relationship between a dimming level, a duty ratio, and a phase difference in a liquid crystal display apparatus according to the present embodiment.

Figure 1:
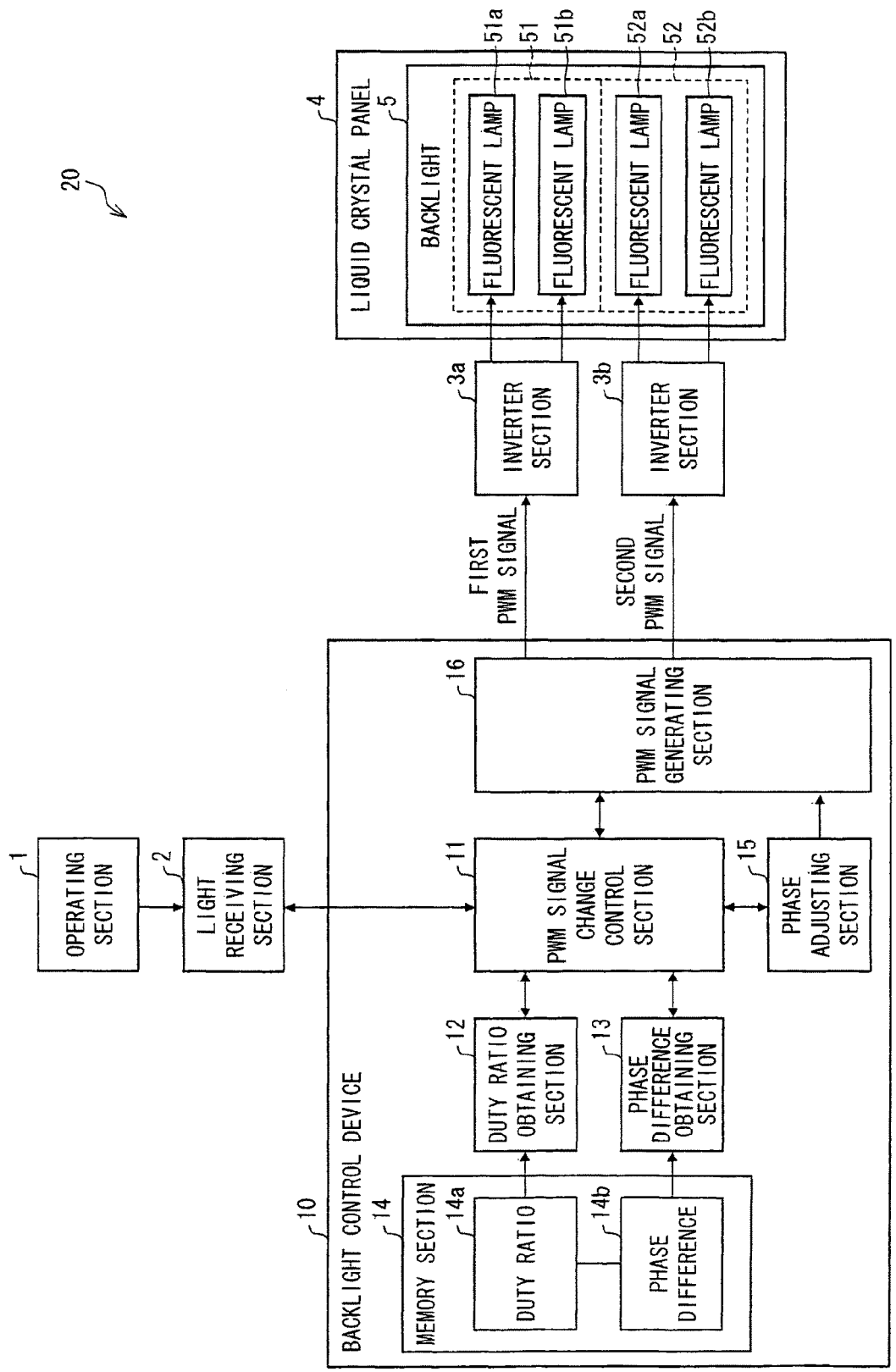
FIG. 1 is a block diagram illustrating a schematic structure of a liquid crystal display apparatus according to the present embodiment.

REFERENCE SIGNS LIST 1 operating section
2 light receiving section
3a, 3b inverter sections (inverters)
4 liquid crystal panel (display panel)
5 backlight
51 first lamp group
51a, 51b fluorescent lamps
52 second lamp group 52a, 52b fluorescent lamps
10, 50 backlight control device
11 PWM signal change control section
12 duty ratio obtaining section
13 phase difference obtaining section
14 memory section
14a duty ratio
14b phase difference
15 phase adjusting section
16 PWM signal generating section
20, 100 liquid crystal display apparatus (display apparatus)

DESCRIPTION OF EMBODIMENTS

One embodiment of the present invention is described below with reference to FIGS. 1 through 15. In the present embodiment, a liquid crystal display apparatus is taken as an example of a non-illuminant display apparatus that carries out display under control of the quantity of light passing through a display panel, which light is emitted from a backlight located on the back side of the display panel.

First, a schematic structure of a liquid crystal display apparatus according to the present embodiment will be described with reference to FIG. 1.

FIG. 1 is a block diagram illustrating a schematic structure of a liquid crystal display apparatus 20 that includes a backlight control device 10, according to one embodiment of the present invention. As illustrated in FIG. 1, a principal part of the liquid crystal display apparatus (display apparatus) 20 includes an operating section 1, a light receiving section 2, inverter sections (inverter) 3a and 3b, a liquid crystal panel (display panel) 4, a backlight 5, and the backlight control device 10. Note that the inverter sections 3a and 3b, the backlight 5, and the backlight control device 10 constitute a backlight device that irradiates the liquid crystal panel 4 with light.

Each of the inverter sections 3a and 3b is a conversion circuit that converts a dc voltage supplied from a power source (not shown) to a ac voltage for driving the backlight, under a PWM signal supplied from the backlight control device 10. The backlight control device 10 will be described later.

The backlight 5, which is a light source that emits light under drive voltages supplied from the inverter sections 3a and 3b, irradiates the liquid crystal panel 4 with light.

The backlight 5 used in the liquid crystal display apparatus 20 is provided with a plurality of fluorescent lamps (cold-cathode tubes or the like), which make up a light source of the backlight 5, and the backlight 5 is constituted by a first lamp group 51 and a second lamp group 52, which are driven under control of the mutually different inverter sections 3a and 3b, respectively. In the liquid crystal display apparatus 20, the backlight 5 has separate regions along the fluorescent lamps, which allows for drive control region by region. In the present invention, it should be noted that the number of the separate regions in the backlight 5 and the number of fluorescent lamps in each region are not particularly limited. Further, a shape of each of the separate regions is not particularly limited. All of the separate regions are not necessarily of one size and one shape. Still further, the layout of the fluorescent lamps in each lamp group is not particularly limited. Each lamp group may be composed of a plurality of adjacent fluorescent lamps. Alternatively, each lamp group may be composed of alternate lamps or alternating two adjacent lamps.

As an example, the backlight 5 of the present embodiment are constituted by the first lamp group 51, which includes fluorescent lamps 51a and 51b, and the second lamp group 52, which includes fluorescent lamps 52a and 52b.

The liquid crystal panel 4, a common transmissive liquid crystal panel, performs display control in such a manner that the quantity of light passing through the liquid crystal panel, which light is emitted from the backlight 5, is controlled pixel by pixel under control of voltages applied to a liquid crystal layer.

The operating section 1, which is used by a user, allows the user to operate the liquid crystal display apparatus 1. In the liquid crystal display apparatus 20, change of images to be displayed on the liquid crystal panel 4, change of display conditions, such as brightness of an image to be displayed, and other changes are carried out according to various kinds of instructions inputted through the operating section 1. The operating section 1, a remote manipulator (remote controller) that sends infrared signals of high frequencies, is an input device, such as a mouse, a keyboard, or a switch, for example.

The light receiving section 2 receives an infrared signal sent from the operating section 1 and then converts the infrared signal into an electrical signal. The light receiving section 2 comprises a light receiving element, such as a PD (Photo-diode), for example.

The backlight control device 10 supplies to the inverter sections 3a and 3b PWM signals, which are adjusted in accordance with a dimming level specified by the user through the operating section 1. To reduce the occurrence of faulty operation caused by the remote controller, the backlight control device 10 of the present invention causes the PWM signals (first PWM signal and second PWM signal), which are respectively supplied to the inverter sections 3a and 3b, to be out of phase with each other in accordance with the user-specified dimming level. The following will specifically describe the structure, operation, and effect of the backlight control device 10.

The backlight control device 10, as illustrated in FIG. 1, includes a PWM signal change control section 11, a duty ratio obtaining section 12, a phase difference obtaining section 13, a memory section 14, a phase adjusting section 15, and a PWM signal generating section 16.

The PWM signal change control section 11 collectively controls operations of the components of the backlight control device 10. For example, the PWM signal change control section 11, upon receipt of the signals from the operating section 1, outputs signals and data to the other sections, which will be described later, and gives instructions for the operations to the sections.

The memory section 14 has stored therein a variety of data for drive control of the backlight control device 10. For example, the memory section 14 has stored therein duty ratio data 14a and phase difference data 14b, both of which are to be supplied to the PWM signal generating section 16. The phase difference data 14b is data on phase difference between the first and second PWM signals. The duty ratio data 14a and the phase difference data 14b are listed in the form of a table covering user-selectable dimming levels. The table will be specifically described later.

The duty ratio obtaining section 12 makes access to the memory section 14 to obtain the duty ratio data 14a corresponding to the user-specified dimming level.

The phase difference obtaining section 13 makes access to the memory section 14 to obtain the phase difference data 14b corresponding to the user-specified dimming level.

The phase adjusting section 15 adjusts a phase difference between the first and second PWM signals, in accordance with the phase difference data 14b obtained by the phase difference obtaining section 13.

The PWM signal generating section 16 generates, for example, the first PWM signal in accordance with the duty ratio data 14a corresponding to the user-specified dimming level, which data is obtained by the duty ratio obtaining section 12. Further, the PWM signal generating section 16 generates the second PWM signal, using the same data as the duty ratio data 14a used for the generation of the first PWM signal. At this moment, the second PWM signal is adjusted so as to be out of phase with the first PWM signal in accordance with the phase difference data 14b obtained by the phase difference obtaining section 13 by the phase adjusting section 15.

The first and second PWM signals, which have been generated by the PWM signal generating section 16, are supplied respectively to the inverter sections 3a and 3b, so that both of the signals are converted into ac voltages for backlight drive. This enables illumination timing of the fluorescent lamps 51a and 51b in the first lamp group 51 to be shifted from that of the fluorescent lamps 52a and 52b in the second lamp group 52.

(Relationship Between Dimming Level and Phase Difference)

A concrete example of the phase difference between the first and second PWM signals will be described below on the basis of an experimental result.

Figure 2:
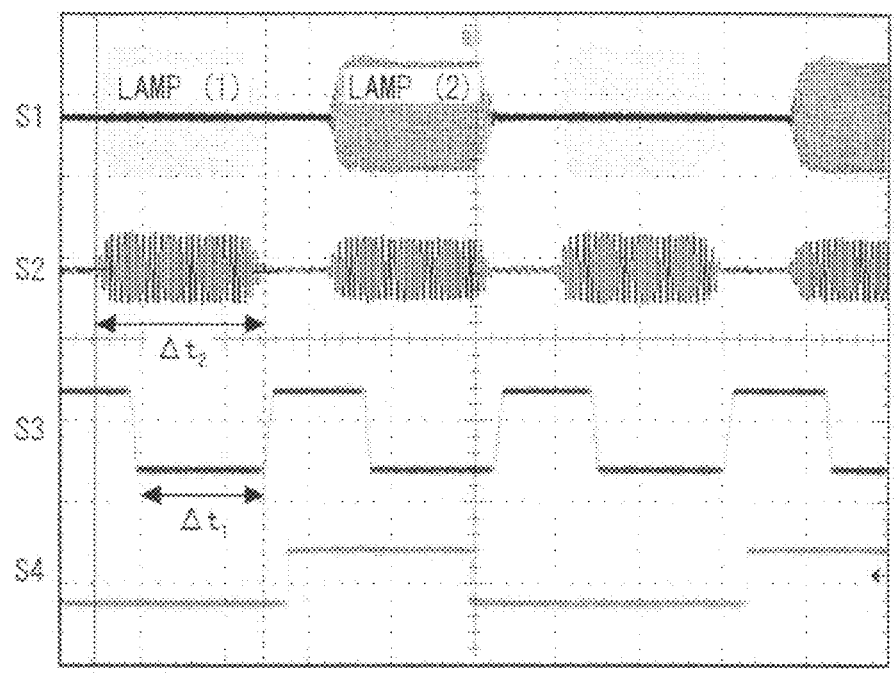
FIG. 2 is a chart showing comparison between output waveform of fluorescent lamps and output waveform of a light receiving section in the conventional liquid crystal display apparatus.
Figure 15:
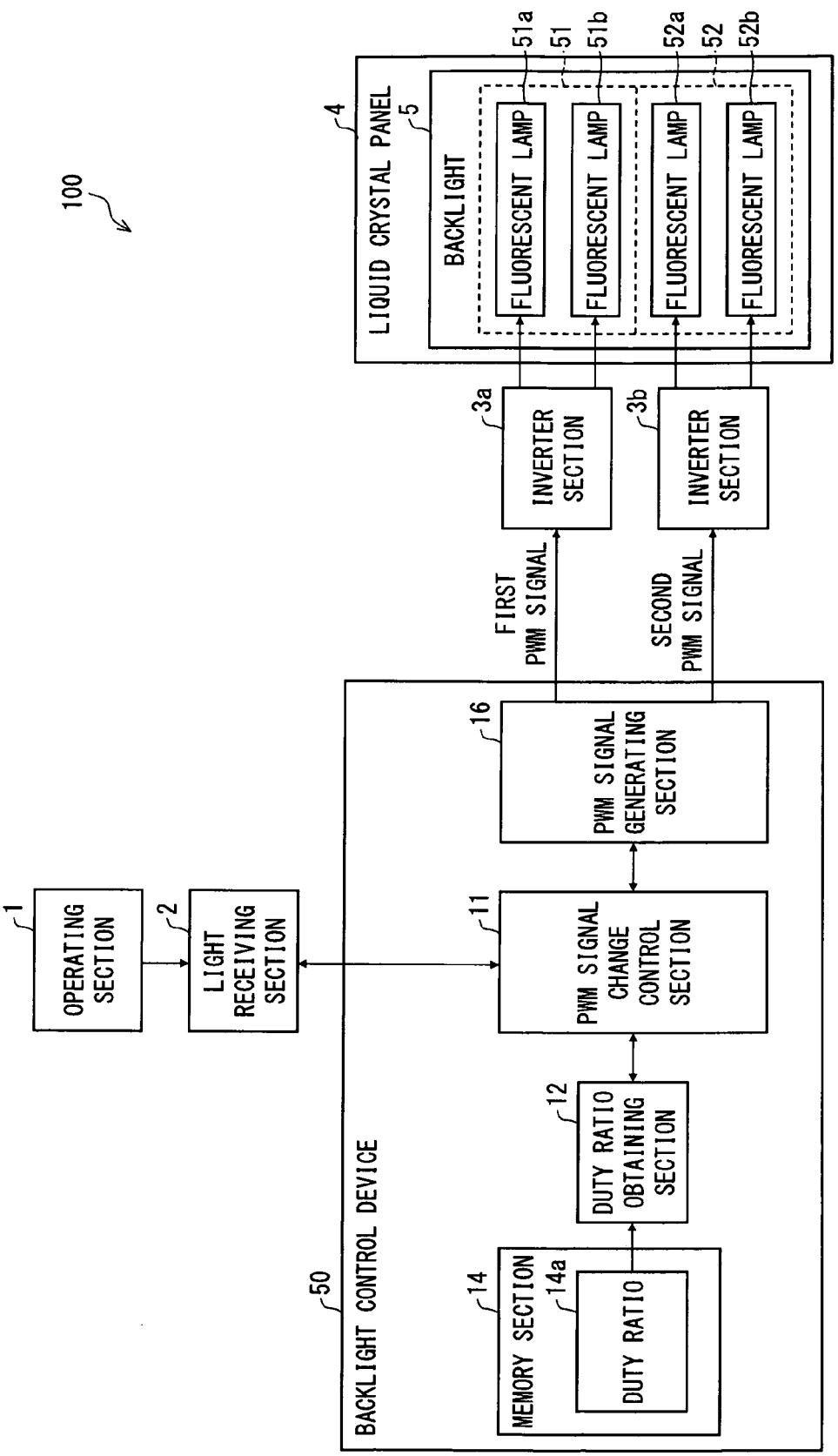
FIG. 15 is a block diagram illustrating a schematic structure of the conventional liquid crystal display apparatus.

First, to confirm that infrared light emitted from fluorescent lamps affects the light receiving section 2, an experiment was carried out using the conventional liquid crystal display apparatus. FIG. 15 is a block diagram illustrating a schematic structure of the conventional liquid crystal display apparatus 100. In FIG. 15, the same members as those in the liquid crystal display apparatus 20 illustrated in FIG. 1 according to the present embodiment are given the same reference numerals. FIG. 2 is a graph showing comparison between waveforms of outputs from the fluorescent lamps and waveforms of outputs from the light receiving section 2, in the conventional liquid crystal display apparatus 100. In FIG. 2, a signal S4 indicates a waveform of a PWM signal (first PWM signal) supplied from the backlight control device 50 to the inverter section 3a. The output of the fluorescent lamps varies according to the PWM signal generated in accordance with the user-specified dimming level. A signal S1 indicates (i) an output voltage waveform of the fluorescent lamp (lamp (1) in FIG. 2: fluorescent lamp 51a or 51b) of the first lamp group 51 and (ii) an output voltage waveform of the fluorescent lamp (lamp (2) in FIG. 2: fluorescent lamp 52a or 52b) of the second lamp group 52. A signal S2 indicates an output voltage waveform obtained as a result of overlaying the output voltages from the lamps (1) and (2). A signal S3 indicates an output waveform of the light receiving section 2.

Note that the quantity of infrared light emitted from the fluorescent lamps varies according to a magnitude of lamp power (power), derived from multiplying a lamp voltage and a lamp current of the fluorescent lamps. Thus, the output voltage waveform of the fluorescent lamp, shown in FIG. 2, can be regarded as being identical to the output waveform of the infrared light emitted from the fluorescent lamps.

Figure 13:
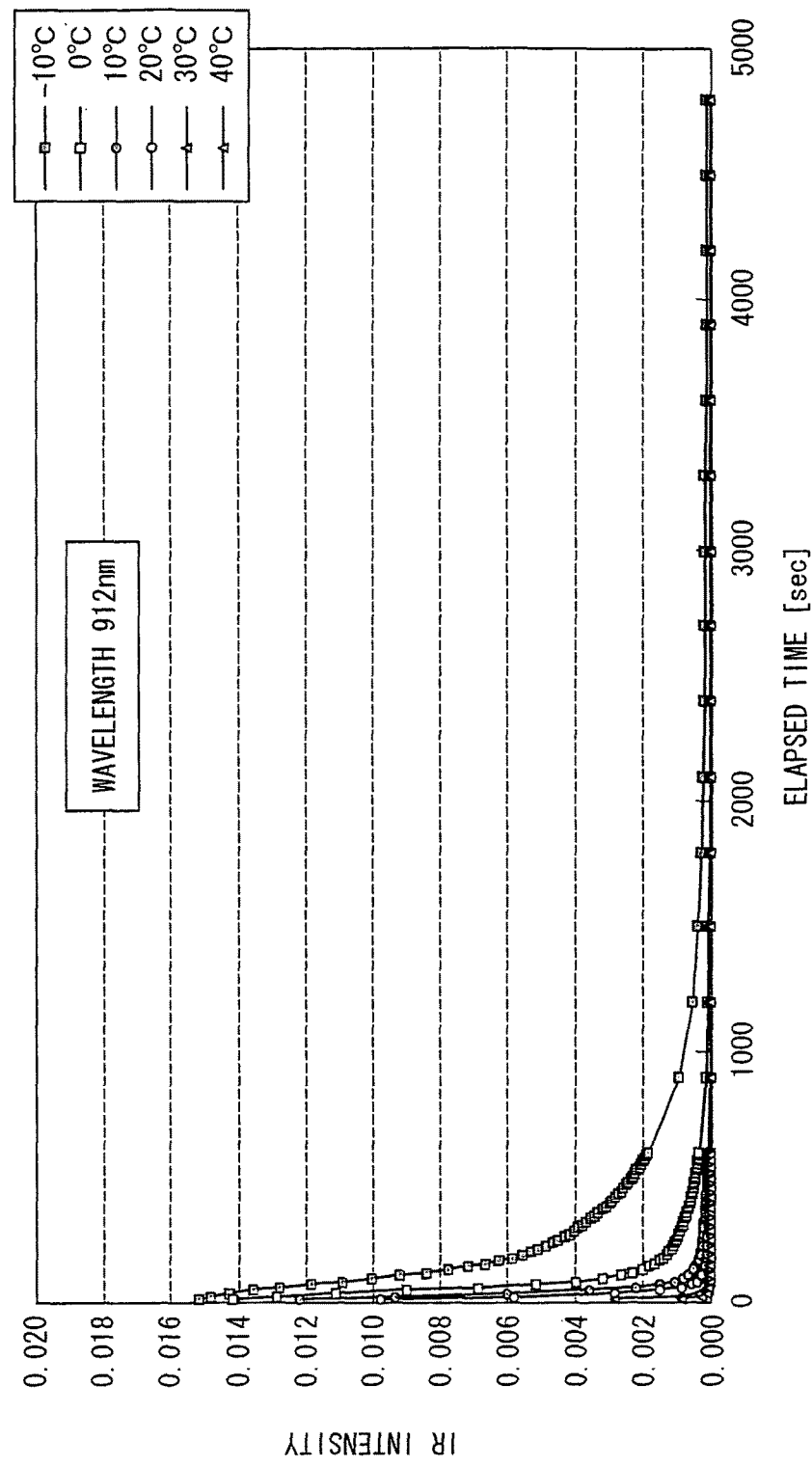
FIG. 13 is a graph showing an example of a profile of intensity (IR intensity) of infrared light with a wavelength of 912 nm emitted from a display apparatus versus time.
Figure 14:
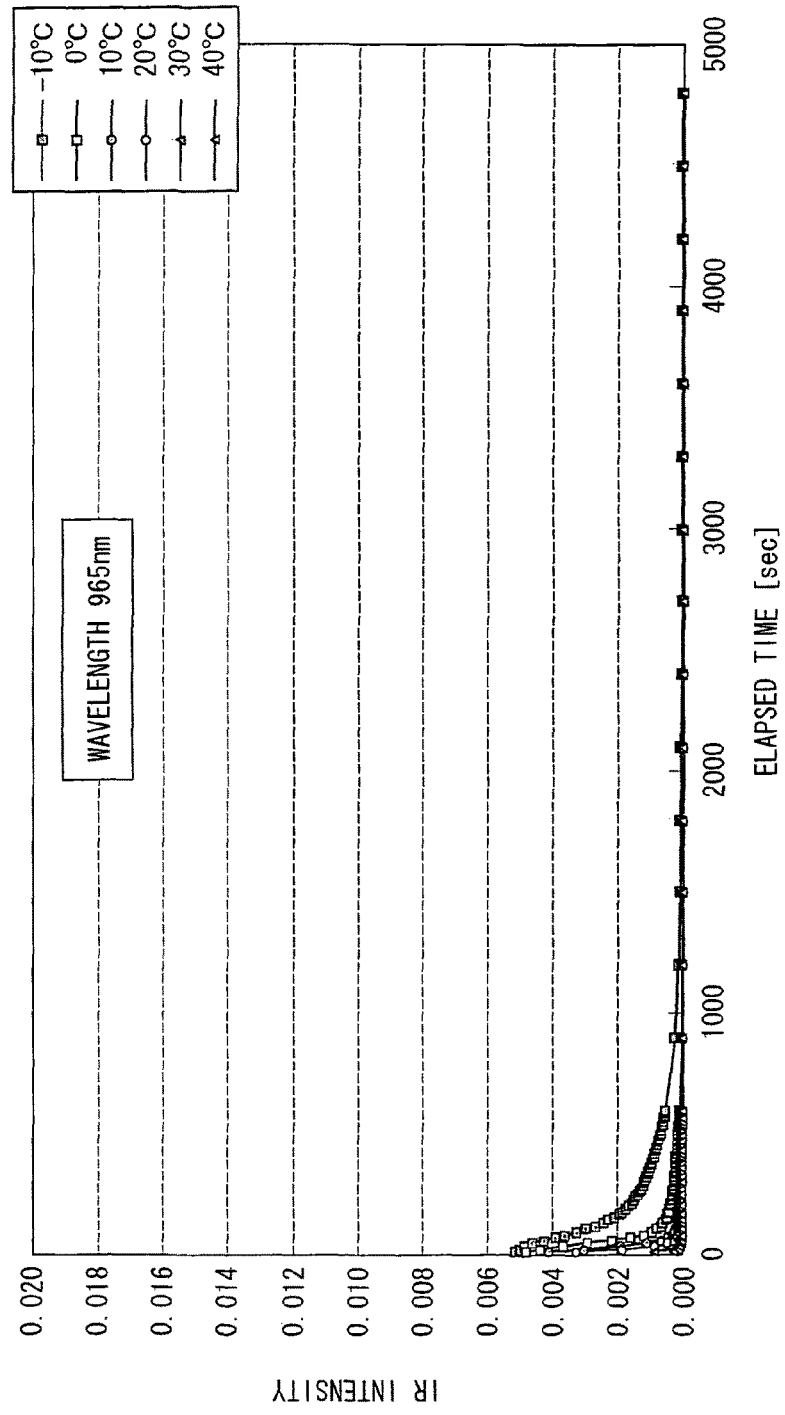
FIG. 14 is a graph showing an example of a profile of intensity (IR intensity) of infrared light with a wavelength of 965 nm emitted from a display apparatus versus time.

In this experiment, the output waveform of the light receiving section 2 was determined with the dimming level varied under the conditions where the first and second PWM signals were 180° out of phase with each other, and each of the frequencies of the first and second PWM signals was 450 Hz. Note that since the intensity of the infrared light has temperature properties as shown in FIGS. 13 and 14, this experiment was carried out at a temperature of 0° which increases the intensity of the infrared light.

Figure 3:
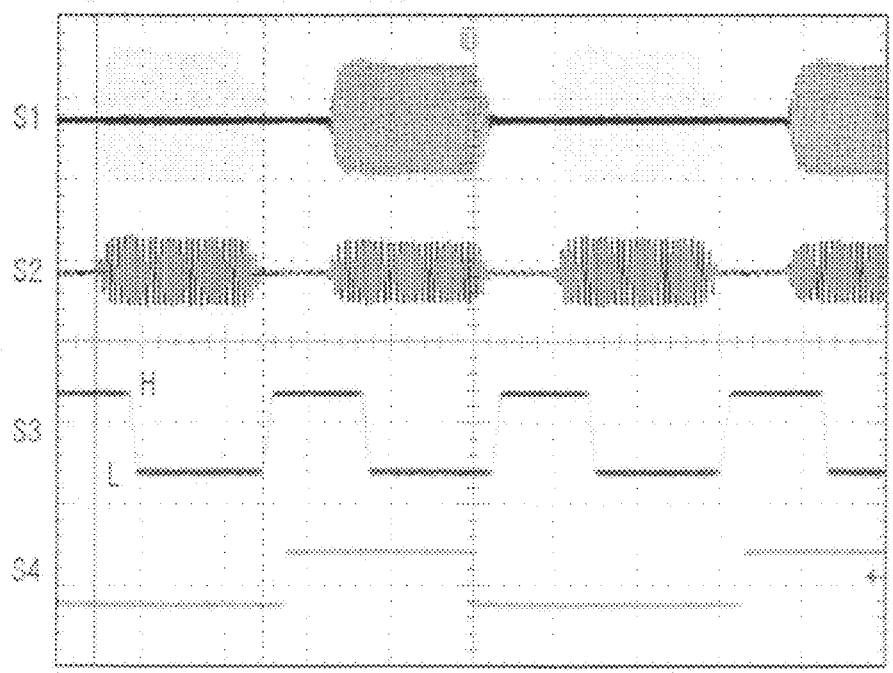
FIG. 3 is a chart showing the result of measurement for comparison between output waveform of the fluorescent lamps and output waveform of the light receiving section at a dimming level of −16, in the conventional liquid crystal display apparatus.

FIG. 3 shows a result of the measurement at a dimming level of −16. The dimming level of −16 corresponds to a duty ratio of 40%. A signal S2 indicates an output waveform of the fluorescent lamps (lamp (1)+lamp (2)), corresponding to a PWM signal for duty ratio of 40%. As shown in FIG. 3, the output (signal S3) from the light receiving section 2 drops, at a certain timing, from a given level (High level, DC5V, for example) to a lower level (to Low level). The timing of the drop is nearly equal to a timing at which the fluorescent lamps are turned on. While the fluorescent lamps are on, the output of the light receiving section 2 is at Low level.

The experiment shows that the output of the light receiving section 2 varies corresponding to the output of the fluorescent lamps. It is considered that this occurs, as previously described, because the infrared wavelength coverage of the light receiving section 2 overlaps the range of a wavelength of infrared light emitted from the fluorescent lamps, and an infrared signal emitted from the fluorescent lamp is thus received by the light receiving section 2. In the conventional liquid crystal display apparatus, the light receiving section 2 receives a non-user-specified signal, i.e. the infrared signal emitted from the fluorescent lamps, which in turn causes the faulty operation of the light receiving section 2.

More specifically, in a case where a dimming level selected by the user is −16, for example, the light receiving section 2 receives from the operating section an operation signal corresponding to the dimming level selected by the user. Then, the PWM signals are generated in accordance with the operation signal, after which the fluorescent lamps are illuminated through the inverter sections 3a and 3b. At this time, the output of the light receiving section 2 normally requires to be at a constant level until the light receiving section 2a receives a subsequent operation signal. As previously described, the infrared signal emitted from the fluorescent lamps, however, is supplied to the light receiving section 2, which changes an output level of the light receiving section 2. This causes faulty operation, such as change from the selected dimming level (−16), the execution of a non-user-requested operation, or failure in execution of the user-requested operation or refusal of the user-requested operation.

Figure 4:
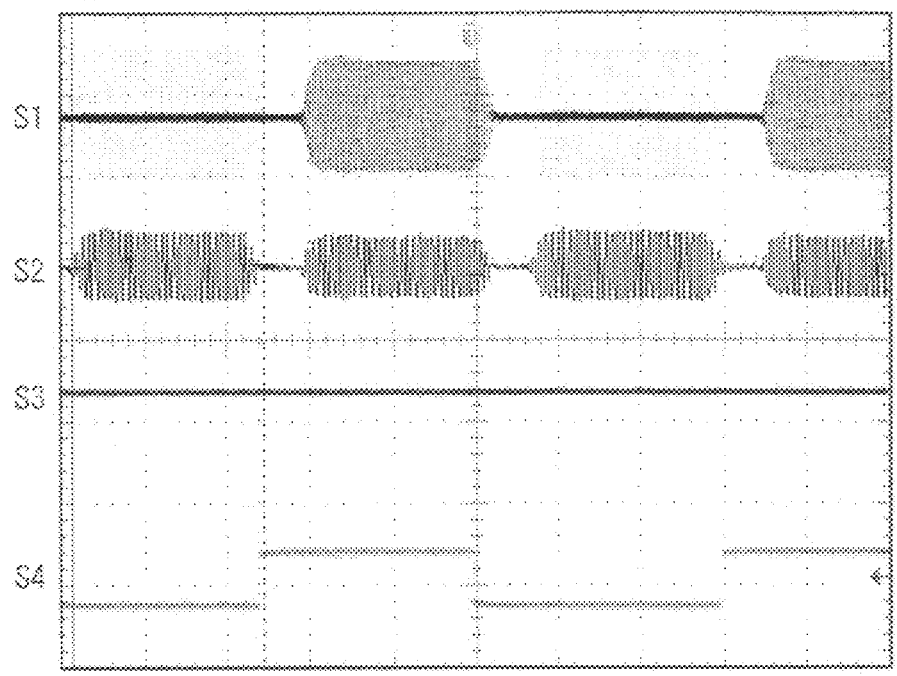
FIG. 4 is a chart showing the result of measurement for comparison between output waveform of the fluorescent lamps and output waveform of the light receiving section at a dimming level of −13, in the conventional liquid crystal display apparatus.
Figure 5:
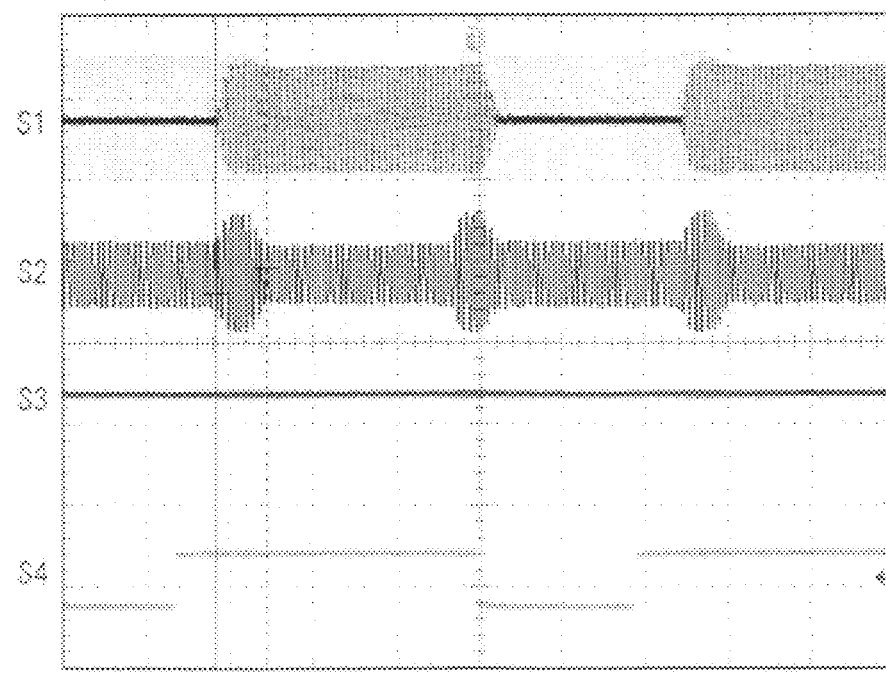
FIG. 5 is a chart showing the result of measurement for comparison between output waveform of the fluorescent lamps and output waveform of the light receiving section at a dimming level of −3, in the conventional liquid crystal display apparatus.
Figure 6:
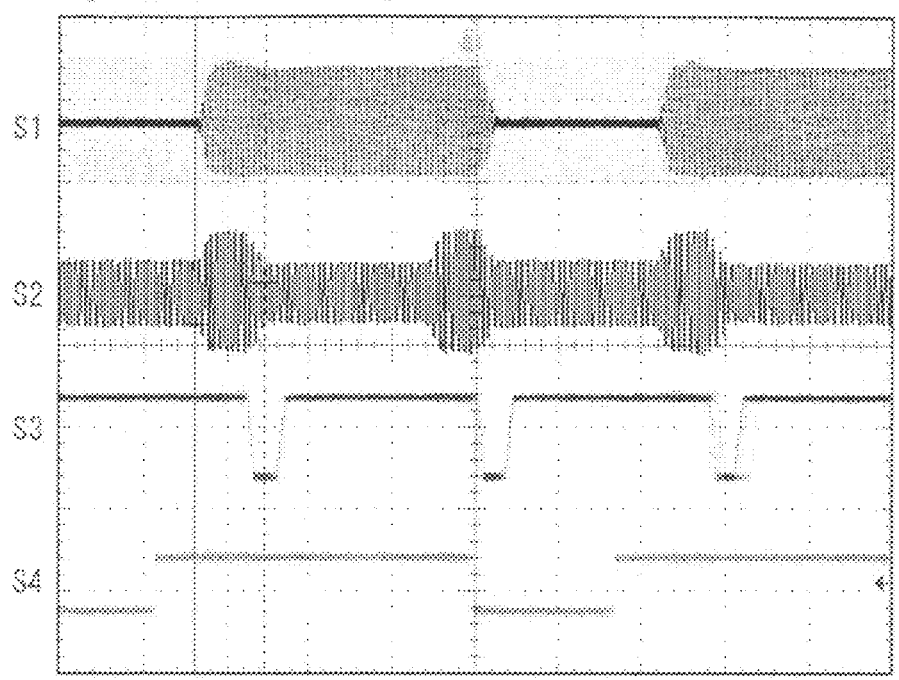
FIG. 6 is a chart showing the result of measurement for comparison between output waveform of the fluorescent lamps and output waveform of the light receiving section at a dimming level of −1, in the conventional liquid crystal display apparatus.
Figure 7:
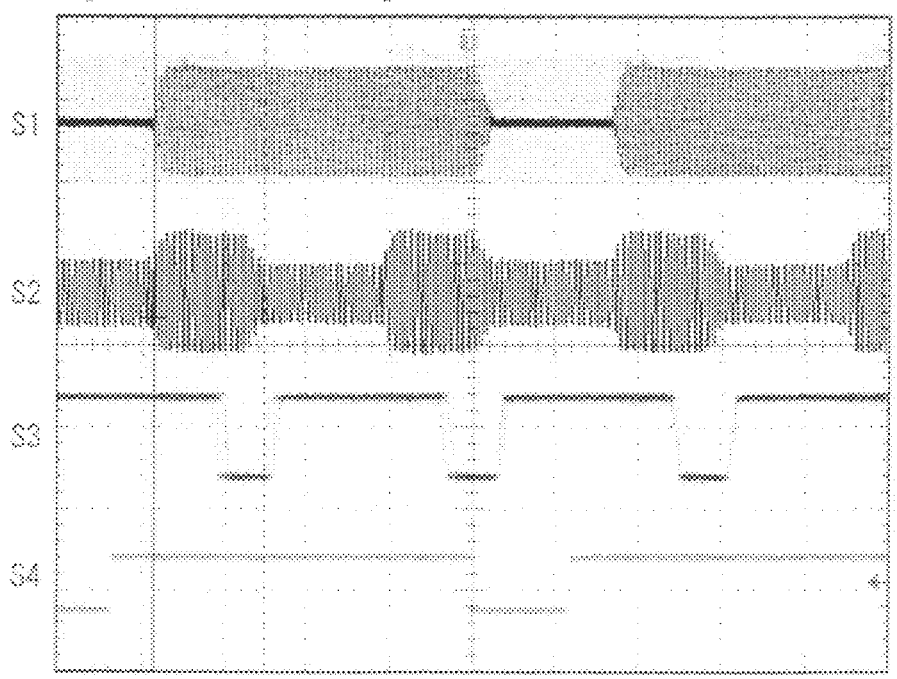
FIG. 7 is a chart showing the result of measurement for comparison between output waveform of the fluorescent lamps and output waveform of the light receiving section at a dimming level of +4, in the conventional liquid crystal display apparatus.
Figure 8:
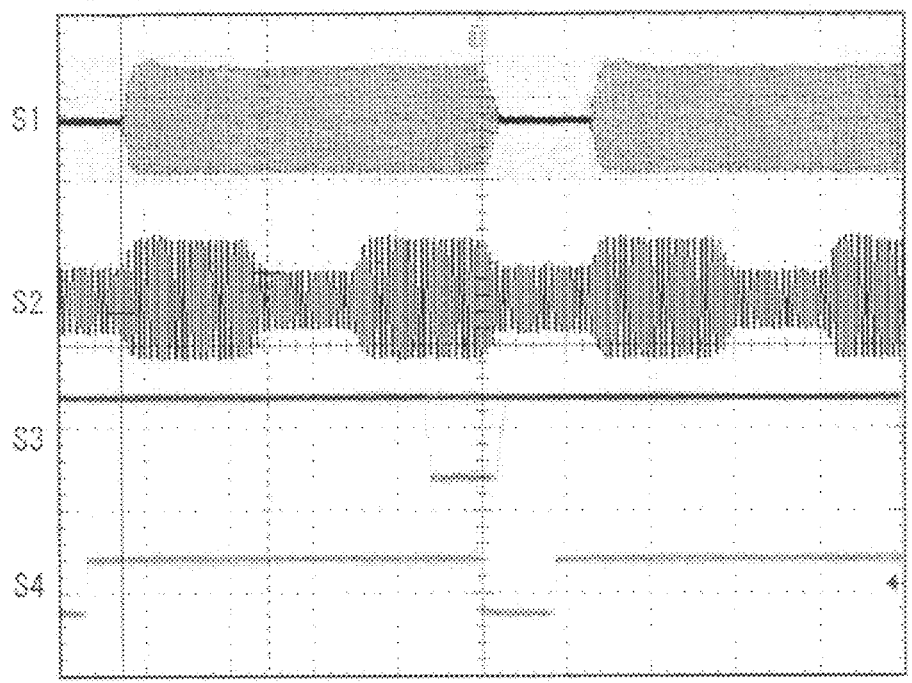
FIG. 8 is a chart showing the result of measurement for comparison between output waveform of the fluorescent lamps and output waveform of the light receiving section at a dimming level of +7, in the conventional liquid crystal display apparatus.
Figure 9:
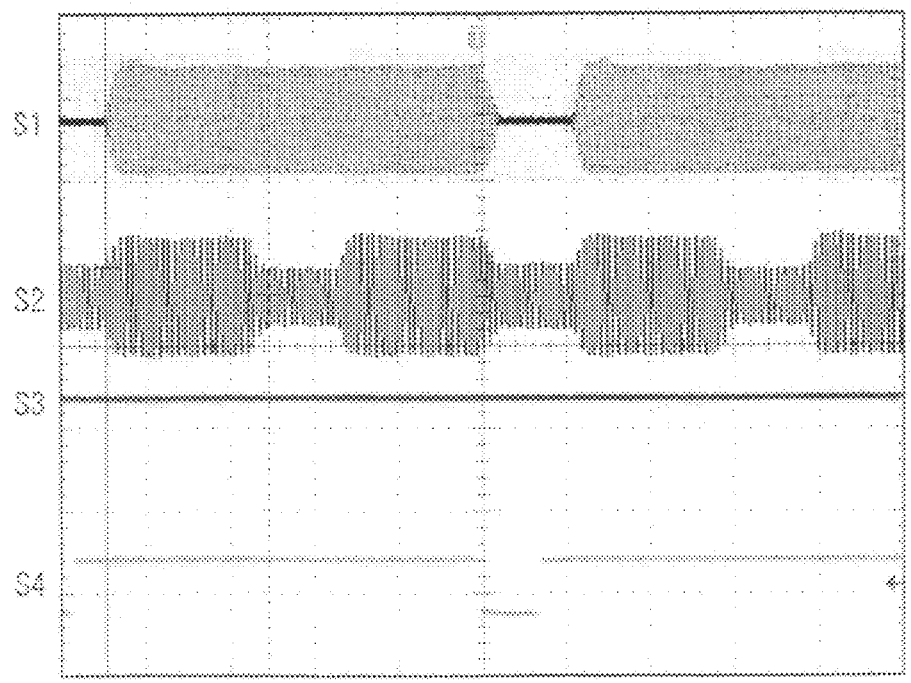
FIG. 9 is a chart showing the result of measurement for comparison between output waveform of the fluorescent lamps and output waveform of the light receiving section at a dimming level of +9, in the conventional liquid crystal display apparatus.
Figure 12:
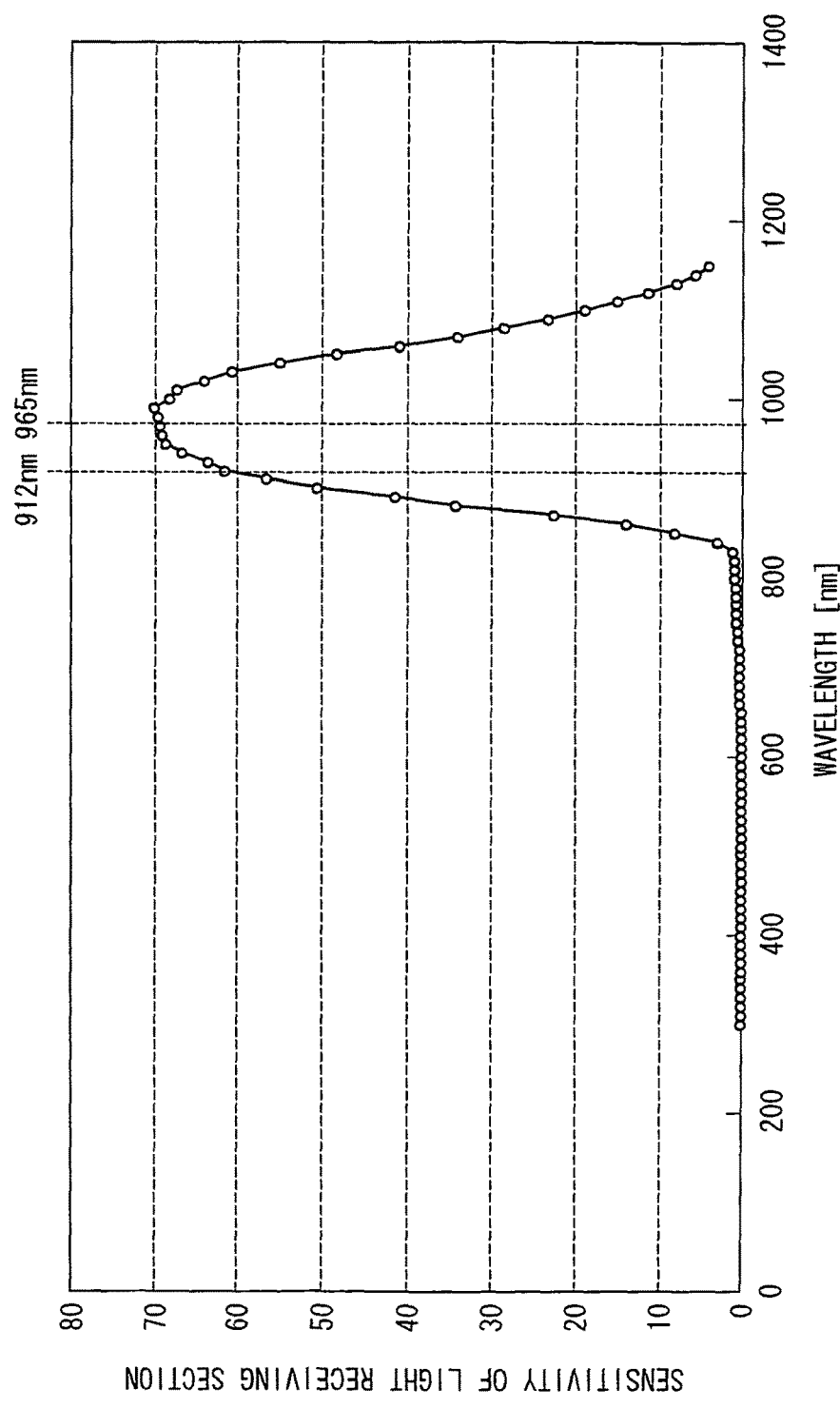
FIG. 12 is a graph showing the sensitivity property of a common infrared reception sensor (light receiving section).

Next, a result of the measurement at a dimming level of −13 will be described with reference to FIG. 4. The dimming level of −13 corresponds to a duty ratio of 46%. A signal S2 indicates an output waveform of the fluorescent lamps (lamp (1)+lamp (2)), corresponding to the PWM signal for the duty ratio of 46%. As shown in FIG. 4, output (signal S3) of the light receiving section 2 maintains a given level (High level, DC5V, for example) regardless of ON/OFF state of the fluorescent lamp. That is, FIG. 4 shows that the light receiving section 2 is not affected by output of the fluorescent lamp at the dimming level of −13. This enables successful execution of the user's operation, without the occurrence of the aforementioned faulty operation.

FIGS. 5 through 9 show results of the measurements at dimming levels of −3, −1, +4, +7, and +9, respectively. As is evident from each waveform of output (signal S3) from the light receiving section 2 in FIGS. 5 through 9, whether or not the light receiving section 2 is affected by output of the fluorescent lamps, i.e. whether or not the faulty operation occurs depends on a selected dimming level.

FIG. 10 shows a relationship between dimming levels and whether or not the faulty operation occurs. More specifically, whether or not the user's instruction had been accepted through the operating section (remote controller) was determined, as responsiveness to the operation of remote controller, at dimming levels ranging from −16 (duty ratio of 40%) to +16 (duty ratio of 100%). As shown in FIG. 10, the operation of the remote controller was missed or ignored at dimming levels ranging from −2 to +8. That is, it was proved that faulty operation occurred at the dimming levels ranging from −2 to +8 due to the effect of infrared signal emitted from the fluorescent lamps.

Consequently, it was proved that the faulty operation occurred only at dimming levels in a certain range (from −2 to +8) of all the range of dimming level. That is, it was proved that the infrared signal emitted from the fluorescent lamps adversely affects the light receiving section 2 when a dimming level is in a certain range. It is considered that this occurs due to properties of the light receiving section 2. Besides, considering that the light receiving section 2 is affected by a dimming level, it is inferred that the effect of the faulty operation in the light receiving section 2 varies depending upon the degree of overlap of a composite waveform (signal S2) obtained from the waveforms of respective outputs from the fluorescent lamps.

As a result of this, it was found that change in phase difference between the first and second PWM signals enables adjustment of the degree of overlap of the composite waveform, which allows for reduction of the occurrence of the faulty operation in the light receiving section 2 due to the infrared signals emitted from the fluorescent lamps. FIG. 11 shows a concrete example of the variations of the adjusted phase difference.

As shown in FIG. 11, the phase difference between the first and second PWM signals is 180° at dimming levels ranging from −16 to −3 and at dimming levels ranging from +9 to +16, but the phase difference is varied depending upon a dimming level at dimming levels ranging from −2 to +8 (in a predetermined range). Setting of specific values of the phase difference is adjusted by checking responsiveness to the remote controller. For example, when the dimming level is −2, the phase difference is set to be 187.7° or 102.7°, and when the dimming level is +8, the phase difference is set to be 254.0° or 169.0°.

With this arrangement, it was confirmed that the faulty operation in the light receiving section 2 was eliminated at all dimming levels, and responsiveness to the remote controller was improved. At dimming levels outside the range from −2 to +8, the phase difference is set to be 180°, which enables shortening the entire fluorescent lamp flashing period. This yields the effect of suppressing interference between the liquid crystal panel 4 and the backlight 5 as well as the effect of reducing the occurrence of the faulty operation in the light receiving section 2.

Note that the phase difference at dimming levels outside the range from −2 to +8 is not limited to 180°, and the phase difference may take on a value at which the faulty operation does not occur in the light receiving section 2.

Further, in the backlight control device of the present embodiment, the dimming level, the duty ratio, and the phase difference can be associated with each other in the form of the table shown in FIG. 11 on the basis of the foregoing experimental results. On this account, the backlight control device 10 of the present embodiment makes reference to the above-described table to generate the first and second PWM signals in accordance with the phase difference determined according to the user-specified dimming level. This makes it possible to reduce the occurrence of the faulty operation in the light receiving section 2 at all dimming levels with a simple arrangement.

As described above, according to the arrangement of the backlight control device 10 of the present embodiment, the phase difference between the first PWM signal for driving the first lamp group 51 and the second PWM signal for driving the second lamp group 52 is changed according to a dimming level when the dimming level is in a predetermined range. This makes it possible to change the phase difference according to a dimming level in such a manner that the light receiving section 2 does not receive infrared light emitted from lamps. With this, it is possible to reduce the occurrence of the faulty operation and reliably perform processing desired by the user. Further, reduction of the occurrence of the faulty operation is realized without the need for change of the dimming level, which enables a reliable display performed according to the dimming level.

It should be noted that the backlight control device 10 according to the present embodiment changes a phase difference between the first and second PWM signals according to a dimming level when the dimming level is in a predetermined range. However, this is not the only possibility. Alternatively, the phase difference may be changed at all dimming levels. This makes it possible to reliably avoid the faulty operation of the light receiving section at all dimming levels.

In FIGS. 10 and 11, "time shift length" is a time lag between illumination start timings of mutually different fluorescent lamps in their respective output voltage waveforms at the time of dimming. "Δt2" is the length of a period corresponding to a protrusion formed in a composite waveform of the output voltage waveforms of the fluorescent lamps that are out of phase with each other at the time of dimming. "Δt2 phase equivalent" is a value into which "Δt2" is converted in unit of phase where one cycle, a time interval between the start of illumination and the start of the next illumination, is 360°, concerning the output voltage waveforms of the fluorescent lamps at the time of dimming.

(Operation Example of the Backlight Control Device 10)

Next, operation example of the backlight control device 10 will be described with reference to FIG. 1, as well as the capabilities of the components of the backlight control device 10.

First, by using the operating section 1 such as a remote controller, the user selects a desired dimming level to change luminance of a display screen of the liquid crystal panel 4. Here, the selected dimming level is +5, for example. In response to the user's operation, the operating section 1 outputs an infrared signal, which is received by the light receiving section 2. The light receiving section 2 supplies an electrical signal, corresponding to the received infrared signal, to the backlight control device 10.

Next, the PWM signal change control section 11 of the backlight control device 10, upon receipt of the electrical signal from the light receiving section 2, instructs the duty ratio obtaining section 12 and the phase difference obtaining section 13 to obtain (i) a duty ratio corresponding to the user-specified dimming level (+5) and to obtain (ii) a phase difference between the first and second PWM signals, which phase difference has been determined according to the user-specified dimming level, respectively. The duty ratio obtaining section 12 and the phase difference obtaining section 13 make reference to the table shown in FIG. 11 and stored in the memory section 14 and then obtain a duty ratio (80%) and a phase difference (229°) both corresponding to the dimming level (+5), respectively.

Then, the PWM signal change control section 11 instructs the PWM signal generating section 16 to generate PWM signals (first PWM signal and second PWM signal) in accordance with the obtained duty ratio (80%). Further, the PWM signal change control section 11 provides the obtained phase difference (229°) to the phase adjusting section 15 and instructs the phase adjusting section 15 to adjust the phase difference between the first and second PWM signals, both of which have been generated by the PWM signal generating section 16.

The phase adjusting section 15 makes adjustment, in accordance with the obtained phase difference (229°), so that the phase difference between the first and second PWM signals is 229.0°. Specifically, the phase difference between the first and second PWM signals can be adjusted by a delay circuit, for example.

The first and second PWM signals, both of which have been generated by the PWM signal generating section 16, are supplied respectively to the inverter section 3a, which controls drive of the first lamp group 51, and the inverter section 3b, which controls drive of the second lamp group 52. The inverter section 3a supplies the first PWM signal to the first lamp group 51 so that the first lamp group 51 is illuminated. The inverter section 3b supplies the second PWM signal to the second lamp group 52 so that the second lamp group 52 is illuminated.

Consequently, the first lamp group 51 and the second lamp group 52 flash repeatedly in an alternating manner with a time difference corresponding to a phase difference of 229.0°.

According to the above arrangement, if the user selects a dimming level that could cause the faulty operation in the light receiving section 2, the phase difference between the first and second PWM signals is adjusted to be a phase difference that enables reducing the occurrence of the faulty operation, which phase difference has been preset in the table. This makes it possible to reduce the occurrence of faulty operation caused by the infrared signals emitted from the fluorescent lamps.

Here, the backlight 5 of the liquid crystal display apparatus 20 according to the present embodiment comprises the first lamp group 51, which is driven under control of the inverter section 3a, and the second lamp group 52, which is driven under control of the inverter section 3b. However, the present invention is not limited to this arrangement. Alternatively, a third lamp group 53 (not shown) may be driven under control of an inverter section 3c (not shown). That is, the number of separate regions in the backlight 5 is not particularly limited. In this case, phase differences concerning first to third PWM signals for driving the inverter sections 3a to 3c respectively are adjusted to be phase differences set in the above-described table. More specifically, the phase difference between the first and second PWM signals, the phase difference between the second and third PWM signals, and the phase difference between the third and first PWM signals may be changed to phase differences set in the above-described table.

The present invention is not limited to the aforementioned embodiments and is susceptible of various changes within the scope of the accompanying claims. Also, an embodiment obtained by suitable combinations of technical means disclosed in the different embodiments are also included within the technical scope of the present invention.

As described above, a backlight control device according to the present invention includes: a phase adjusting section that changes a phase difference between a first PWM signal for driving a first lamp group and a second PWM signal for driving a second lamp group according to a dimming level when the dimming level is at least in a predetermined range of all dimming levels, the first and second lamp groups each including at least one lamp.

As described above, a display apparatus according to the present invention is arranged such that the backlight device includes any one of backlight control devices.

This eliminates the light receiving section to receive infrared light emitted from the lamps, which enables reduction of the faulty operation in the light receiving section. Therefore, it is possible to provide a backlight control device which enables reduction of the faulty operation in an infrared-based apparatus, and a display apparatus including the backlight control device.

Specific embodiments or examples implemented in the description of the embodiments only show technical features of the present invention and are not intended to limit the scope of the invention. Variations can be effected within the spirit of the present invention and the scope of the following claims.

INDUSTRIAL APPLICABILITY

A backlight control device of the present invention adjusts a phase difference between mutually different PWM signals, which enables reducing the occurrence of faulty operation in an infrared-based apparatus. Thus, the backlight control device of the present invention is applicable to a backlight device used in a liquid crystal display apparatus and the like apparatus.

The invention claimed is:

1. A backlight control device which provides PWM control inverters with PWM signals generated in accordance with a dimming level input through a light receiving section that receives infrared light, the inverters causing lamps that emit visible light and infrared light to illuminate, the backlight control device comprising:
a phase adjusting section configured to change a phase difference between a first PWM signal for driving a first lamp group and a second PWM signal for driving a second lamp group according to the dimming level when the dimming level is at least in a predetermined range of all dimming levels, the first and second lamp groups each including at least one lamp;
a memory section having a table stored therein, the table having (i) the dimming level input through the light receiving section, (ii) a duty ratio corresponding to the dimming level, and (iii) the phase difference between the first and second PWM signals corresponding to the dimming level, wherein (i), (ii), and (iii) are associated with each other;
a duty ratio obtaining section for referencing the table and obtaining the duty ratio corresponding to the input dimming level;
a phase difference obtaining section for referencing the table and obtaining the phase difference corresponding to the input dimming level; and
a PWM signal generating section for generating the first and second PWM signals in accordance with the duty ratio obtained by the duty ratio obtaining section,
wherein the phase difference adjusting section is configured to set the phase difference between the first and second PWM signals, both of which are generated by the PWM signal generating section, to be the phase difference obtained by the phase difference obtaining section.

2. The backlight control device according to claim 1, wherein
the phase adjusting section is configured to sets the phase difference between the first and second PWM signals to be 180° at a dimming level outside the predetermined range.

3. A display apparatus comprising:
a display panel; and
a backlight device for irradiating the display panel with light,
wherein the backlight device includes a backlight control device according to claim 1.

* * * * *